Jan. 21, 1958     L. K. DAVIS     2,820,625
PRE-STRESSED INSTRUMENT ARM
Filed Nov. 20, 1953     2 Sheets-Sheet 1
FIG. I
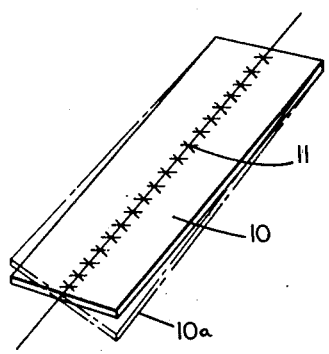
FIG. II
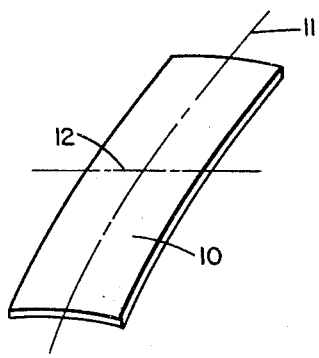
FIG. III
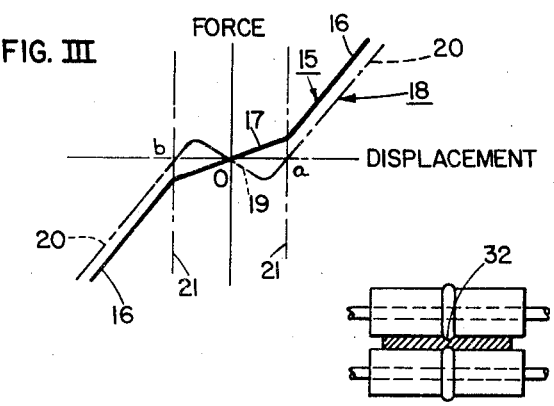
FIG. IV
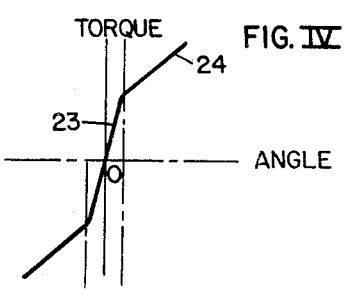
FIG. V
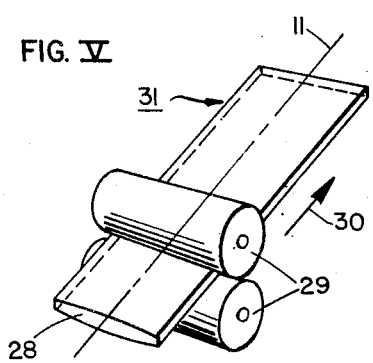
FIG. V(b)
FIG. V(a)
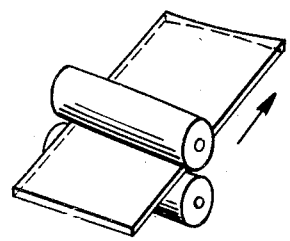
*INVENTOR.*
LINCOLN K. DAVIS
BY
Curtis, Morris & Safford
*ATTORNEYS*

Jan. 21, 1958   L. K. DAVIS   2,820,625
PRE-STRESSED INSTRUMENT ARM
Filed Nov. 20, 1953   2 Sheets-Sheet 2
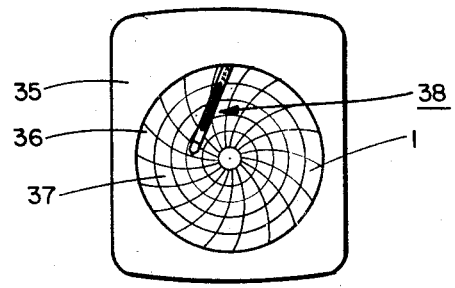
FIG. VI
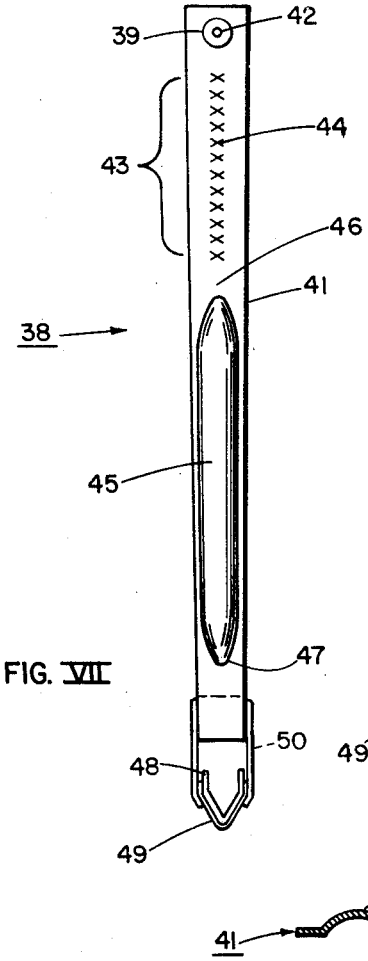
FIG. VII   FIG. VIII
FIG. IX
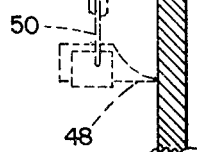
INVENTOR.
LINCOLN K. DAVIS
BY
Curtis, Norris + Safford
ATTORNEYS

United States Patent Office 2,820,625
Patented Jan. 21, 1958

2,820,625

PRE-STRESSED INSTRUMENT ARM

Lincoln K. Davis, Brockton, Mass., assignor to The Foxboro Company, Foxboro, Mass., a corporation of Massachusetts Application November 20, 1953, Serial No. 393,325

3 Claims. (Cl. 267—1)

The present application is a continuation-in-part of copending application, Serial No. 4,904, filed January 28, 1948, now abandoned.

The present invention relates to instrument arms with improved properties and more particularly to instrument arms which are pre-stressed or preloaded or have pre-stressed or preloaded portions in which the pre-stressing provides a double effect. The first effect increases their flexibility, that is, makes them less rigid in bending, and the second increases their torsional rigidity, that is, makes them more resistant to twisting about their longitudinal axes.

In certain instruments for recording, indicating, or controlling with respect to a variable condition, it is often necessary or desirable to use flexible arms to obtain freedom of motion or some predetermined force-dispersement characteristic along a certain path, combined with maximum resistance to motion in other directions. For example, in such an instrument a pen or stylus, an indicating finger, operating member or portion, is commonly supported at one end of an arm which is mounted at the other end thereof on a driving element such as a movable carriage or rotatable shaft.

In the described embodiment of the invention a pen is shown on such an arm, with the pen, at one end of the pen arm, adapted to be in engagement with and movable over the surface of a moving chart as a means of producing a record of the changing values of a variable condition. The other end of the pen arm is shown fixed to a rotatable shaft, the rotation of which is arranged to move the pen across the chart surface.

Under modern instrumentation conditions it is desirable that a pen arm as shown be lightweight in order to achieve sensitivity of response to signals representative of variable condition value changes. The pen should be under almost zero pressure against the chart to avoid frictional detraction from the sensitivity of response of the pen arm, and that the pen be liftable away from the chart a substantial distance in order, for example, to remove or insert a chart. It is further desirable that after such lifting, the pen may be returned to engagement with the chart or a substitute therefor, and that essentially the same pressure relation as the pen previously had with the chart be maintained. While it is desirable to avoid too much pen pressure against the chart, a slight and noncritical pressure may be needed to keep the pen from being disengaged from the chart by waves in the chart paper, vibration or other disturbances. Further, it is desirable that the pen be restrained against torsional movement or influences, in order to avoid tilting or misalignment with attendant inaccuracies in the record.

In the past, various pen arm structures and adjustment devices therefor have been used, but none were able to achieve all the desired results as above. Sufficient flexibility was accompanied by insufficient torsional resistance and either undependable pen-chart pressure relations, or undesirable associated pen pressure adjustment structures.

According to the described embodiment of the present invention, a lightweight pen arm is provided which is pre-stressed to reduce bending stiffness and also to increase torsional rigidity, with the result that a pen arm is produced with all the desired functions and results as above. This may readily be accomplished, as explained hereinafter, essentially without change in the pen arm dimensions, shape, or weight. The pen arm of this invention is capable of noncritical pen-chart pressure adjustment to provide a wide band of tolerance therein, and this adjustment may be made by slightly bending the arm between two fingers.

In the described embodiment of the present invention, only a portion of the instrument arm is made flexible since an arm flexible throughout may form a bow which may be undesirable in some cases in that it may shorten the effective length of the arm and may therefore cause serious inaccuracy. The remainder of the arm or a portion thereof may be stiffened, as by lengthwise ridges, or the like.

The novel features which are believed to be characteristic of this invention will be particularly pointed out in the claims appended hereto. Although the invention is described in connection with a pen arm, it may be incorporated in other instrument arms wherein it is desired that a portion of the arm accurately follow the movement of a driving element while the arm provides a great flexibility transversely to its path of motion and a high longitudinal torsional stiffness.

The objects and advantages, and the manner in which it may be carried out, may be better understood by referring to the following description taken in connection with the accompanying drawings forming a part hereof, in which:

Figure I illustrates a metal strip pre-stressed according to the invention;

Figure II illustrates somewhat diagrammatically one form which the pre-stressed strip of Figure I may take;

Figures III and IV are curves to assist in explaining the action of pre-stressing according to the invention;

Figure V illustrates a method of pre-stressing a strip using rolls; Figures Va and Vb illustrate modified forms of strip and rolls;

Figure VI is a face view of a recording instrument in which an instrument arm embodying this invention may be used;

Figure VII is an enlarged and more detailed view of the pen arm of the instrument of Figure VI;

Figure VIII is an edge view of the pen arms of Figures VI and VII; and

Figure IX is a cross section of the pen arm taken as on line IX—IX of Figure VIII.

Referring now to Figures I and II, these figures illustrate a flat strip 10 of metal pre-stressed according to this invention. The strip 10 in the form shown comprises a single uniform thickness of homogeneous metal. The strip 10 is peened as indicated along the central longitudinal axis 11 but not along the longitudinal side margins. This peening places the central portion of the strip in compression which tends to lengthen it, placing the side margins in tension. Such a strip, when bent longitudinally, will arch somewhat transversely, as shown to an exaggerated degree in Figure II, since the compressed center section tries to relax by taking a larger radius than the side margins, and in so doing, it causes arching and aids bending in either direction. Such a strip exhibits decreased bending resistance, that is to say, it bends more easily about a transverse axis 12 than the original unstressed strip. But such strip also exhibits increased torsional resistance against twisting about longitudinal or neutral axis 11 as indicated by position 10a in Figure I, because the pre-loading of the side margins, placing them in tension, resists the lengthening of them produced by twisting.

The behavior of such a pre-stressed strip is illustrated by the curves shown in Figures III and IV. Referring first to Figure III, bending force F is plotted as a function of the resultant displacement or strain D, the origin being indicated by O. The solid line curve 15 has straight ends 16 in accordance with Hooke's law but the intermediate portion 17 (between lines 21) has less slope showing that less force is required for a given displacement in this region. Thus, in this region the compressed center portion of the strip 10 aids bending, providing lessened effective bending modulus.

Peening of the center of the strip 10 may be carried sufficiently far to cause snap action about transverse axis 12. Such snap action condition is indicated by the dot-and-dash line curve 18. Here the strip 10 is in unstable equilibrium or on dead center when flat, as indicated by curve 18 passing through the origin O; unstable throughout the intermediate portion 19 (between lines 21) of the curve; and stable in two positions a and b on the opposite sides of the origin, having normal spring action at greater displacement, as indicated by the straight ends 20 of the curve. Snap action occurs when over-centering action predominates. By over-centering action is meant an action in which the displacing force of the spring acts away from central position when the spring is displaced from central position, in contrast to an action in which the force exerted by the spring acts toward central position when the spring is displaced from central position. This last action is normal spring action. In general, stressing to the point of snap action is not desirable. But in the event strip 10 is a part of a structure that supports it in such a manner that snap action cannot occur, then stressing may be carried to a point limited only by the properties of the material used.

It is obvious that the metal may be stressed to a condition midway between the two curves 15 and 18 so that the intermediate region is approximately horizontal, in which case the metal strip 10 will be limp, requiring substantially no force in bending in either direction through the region in which the curve is horizontal, as may be desired in certain instrument arm arrangements.

Referring to Figure IV angular force or torsional force T is shown plotted as a function of angular deflection A, the origin being indicated by O. The curve shown herein has an intermediate portion 23, passing through the origin O, of relatively high slope where a relatively high angular force is required to obtain a relatively small angular displacement. Beyond the central region the curve has a less steep slope as at 24, indicating a displacement corresponding to the normal characteristics of the material. The greater slope of the intermediate part of the curve lies in the region in which the compressed center section and stretched margins of the strip resist torsion, providing increased effective torsional modulus.

Referring now to Figure V, another method is shown for pre-stressing a metal strip to place the metal along the longitudinal center line 11 in compression and that along the side longitudinal margins in tension. This strip may be originally fabricated with a curved or arched cross section thicker in the center than at the edges, as indicated at 28. The strip may be arched on one side only and plane on the other. Such a strip is then passed between cylindrical rolls 29 in the direction of the arrow 30 which rolls flatten the strip into a rectangular cross section portion indicated by 31. This rolling operation on this particular shape compresses the metal along the center line 11 and tensions the longitudinal side margins.

The strip need not be rolled to final flatness. It may be flat initially and then rolled to some nonrectilinear cross section as illustrated in Figures Va and Vb. Or, the cross section may be of any regular or irregular shape and then rolled to some other shape, provided the principle of compressing the metal along the center line or neutral axis is followed. The upper and lower rolls need not necessarily be the same. One may be crowned and the other cylindrical. In Figure Va both upper and lower rolls are crowned and flat stock of rectangular cross section is rolled into stock which is thinner along the longitudinal center line than at the longitudinal edges.

If desired, a beaded roll, such as shown in Figure Vb may be used. Here flat stock of rectangular cross section is passed between the beaded rolls which roll a visible groove 32 along the central longitudinal axis. Such a groove may be either on top or bottom surfaces, or on both surfaces, depending upon the shape of the rolls. The presence of the grooves formed by the beaded rolls has the further advantage of assisting in identifying pre-stressed stock at a glance. The peening marks in Figure I, and whenever peening is used, can also be made intentionally visible for identification.

Instead of only one bead on a roll, two or more beads close together on the same roll may be used. Or, if the strip is very wide, the beads may be separated so that there are actually two longitudinal axes of compression disposed nearer the longitudinal edges, leaving the central longitudinal axis tensioned but inactive and leaving both edges under tension to provide the increased torsional stiffness. A tensioned central longitudinal axis is permissible because it is neutral and placing the strip in torsion does not change its length. This form has the disadvantage, however, in that it may overload the axes of compression.

It will be understood that to improve bending characteristics of the strip shown in Figure I, that is to obtain minimum bending rigidity, the outer longitudinal margins or intermediate longitudinal axes between the center axis 11 and the margins of the unstressed strip may be peened so as to place them under compression, thus placing the metal along the center line 11 under tension, and also leaving the edges under tension.

In any of the strips described above the pre-stressing may be obtained by heating the entire strip to softening temperature and then selectively quenching along the longitudinal center line. This shortens the entire strip while the longitudinal margins are still soft. Further cooling then puts these margins in tension. The same treatment may be applied along any axis to be placed in compression.

The examples of pre-stressing given above may be applied to iron and steel and alloys thereof, and also to non-ferrous and other materials susceptible to such treatment. The peening may penetrate to various depths from mere surface peening where only the skin of the metal is compressed to deeper peening when the entire thickness of the metal sheet is compressed.

In the case above described of pre-stressing by peening or rolling, the metal may first be heated to remove internal strains, if any, prior to such peening or rolling, and in each case the peening or rolling is done cold, thus cold working the metal.

The instrument of Figure VI, as shown comprises a housing 35 with a circular chart opening 36 therein, a rotatable chart 37 in alignment with the opening 36, and a vertically disposed pen arm unit 38 in association with the chart 37 for generally radial movement thereover in response to changes in a variable condition.

Figures VII, VIII, and IX show the details of the pen arm unit 38. At the upper end a mounting sleeve 39 and set screw 40 are used to secure the pen arm 41 to a shaft 42 which is rotatably driven in the instrument in response to changes in a variable condition. Adjacent the driven end of the pen arm 41, a portion 43 of the pen arm is pre-stressed according to the teachings hereinbefore set forth, and as indicated by a central line of x's 44. Throughout most of the remainder of the pen arm, a reinforcing ridge 45 is formed. This ridge 45 is located laterally centrally of the pen arm 41 and extends lengthwise thereof from a point 46 adjacent the lower end of the pre-stressed section to a point 47 adjacent the lower end of the pen arm. A V pen 48 is mounted on the lower end of the pen arm in a well-known arrangement comprising an angled clamp 49 with a wire support 50 secured thereto and to the lower end of the pen arm.

Figure VIII shows how this pen arm may be bent away from the chart 37 to remove or insert a chart, with a solid line showing of the pen arm in a bent up position and a dotted line showing of the pen arm in engagement with the chart 37. It may be noted that the pen arm 41, even though bent, remains straight throughout the portion which is reinforced by the ridge 45, and that all the bending occurs in the pre-stressed portion 43. Thus the pen arm 41 is substantially rigid throughout a good portion of its length, and yet is very flexible with respect to movement toward and away from the chart, without being torsionally weak. Only a potion of this arm is thus made flexible by pre-stressing. If it is pre-stressed throughout it might form a bow which may be undesirable in that it may shorten the effective length of the arm, with possible consequent serious inaccuracy in the operation of the pen arm.

With this pen arm structure and arrangement, the pen arm may be lightweight to achieve sensitivity of response to signals representative of variable condition changes. Further, the pen may be under almost zero pressure against the chart, thereby avoiding frictional detraction from the sensitivity of response of the pen arm, and yet the pen is restrained against torsional movement or influences.

From the foregoing it will be seen that this invention provides new and novel instrument arms with reduced bending rigidity and increased torsional rigidity.

As many embodiments may be made of the above invention and as changes may be made in the embodiments above set forth without departing from the scope of the invention, it is to be understood that all matter hereinbefore set forth or shown in the accompanying drawings is to be interpreted as illustrative and not in a limiting sense.

I claim:

1. For use in an instrument of the type described, an instrument arm and mounting assembly comprising a movable mounting, an instrument arm connected to said mounting and moved thereby during operation along a path, said arm including a flexible strip portion near said mounting and a rigid portion spaced from said mounting, said rigid portion being connected to said mounting by said flexible strip portion, said flexible strip portion being relatively wide in the direction parallel to and relatively thin in the direction perpendicular to said path, and said flexible strip portion being compressively pre-stressed only in the central longitudinal region thereof so that both longitudinal edges are tensilely pre-stressed whereby said arm exhibits increased initial flexibility over a substantial arc of bending perpendicular to said path and exhibits increased torsional stiffness about its longitudinal axis, said pre-stressing being insufficient to produce snap-action in said flexible strip portion.

2. For use in an instrument of the type described, an instrument arm adapted to be moved in a path along the surface of a recording medium, said arm having a first portion which is arranged to have a predetermined degree of flexibility and a predetermined degree of torsional rigidity, said arm having a second portion which by thickness-reducing compression treatment applied only to the central longitudinal region thereof is pre-stressed to provide said arm with increased initial flexibility over a substantial arc of bending with respect to said predetermined degree of flexibility so that said arm may readily be lifted away from the surface of said recording medium to permit the making of operational adjustments, said pre-stressing also providing said arm with increased torsional rigidity with respect to said predetermined degree of torsional rigidity so that said arm is less subject to twisting and thereby produces a more accurate recording on said record medium.

3. For use in an instrument of the type described, an instrument arm and mounting assembly comprising a movable mounting, an instrument arm connected to said mounting and movable thereby along a predetermined path as a part of the operation of said instrument, said arm including a rectangular cross-section first length adjacent said mounting with said first length having a predetermined degree of flexibility and a predetermined degree of torsional rigidity, a one-piece generally rectangular cross-section flexible portion as a second length of said arm adjacent said first length and connected to said mounting by said first length, said second flexible length being relatively wide in the direction parallel to and relatively thin in the direction perpendicular to said path, said second flexible length being pre-stressed by thickness reducing compression only in the central longitudinal region thereof so that both longitudinal edges are tensilely pre-stressed whereby said arm at said second flexible length exhibits both increased initial flexibility over a substantial arc of bending and increased longitudinal torsional stiffness with respect to said predetermined degree of flexibility and torsional stiffness, a third rectangular cross-section length adjacent said flexible second flexible length and connected to said first length by said second flexible length, with said third length having said predetermined degrees of flexibility and torsional rigidity, and a reinforced portion as a fourth length of said arm adjacent said third length and connected to said second flexible length by said third length, said reinforced portion having substantially decreased flexibility with respect to said predetermined degree of flexibility.

References Cited in the file of this patent

UNITED STATES PATENTS

| | | |
|---|---|---|
| 1,514,524 | Hodgkinson | Nov. 4, 1924 |
| 1,630,296 | Heesch | May 31, 1927 |
| 1,987,166 | Valverde | Jan. 8, 1935 |
| 2,153,365 | Conner | Apr. 4, 1939 |
| 2,361,202 | Hodgkins | Oct. 24, 1944 |
| 2,557,947 | Deakin | June 26, 1951 |
| 2,664,335 | Gorham | Dec. 29, 1953 |